T. L. BURTON.
CLASP BRAKE DESIGN FOR SIX WHEELED TRUCKS.
APPLICATION FILED SEPT. 14, 1916.
1,274,676.
Patented Aug. 6, 1918.
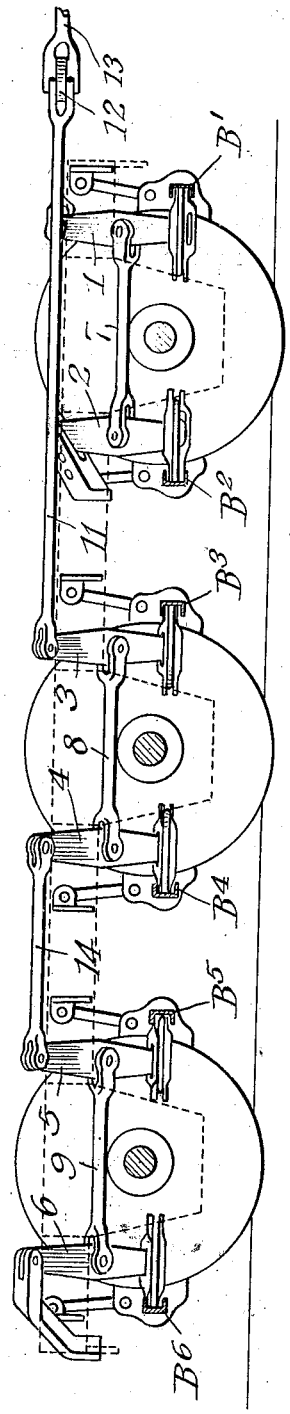
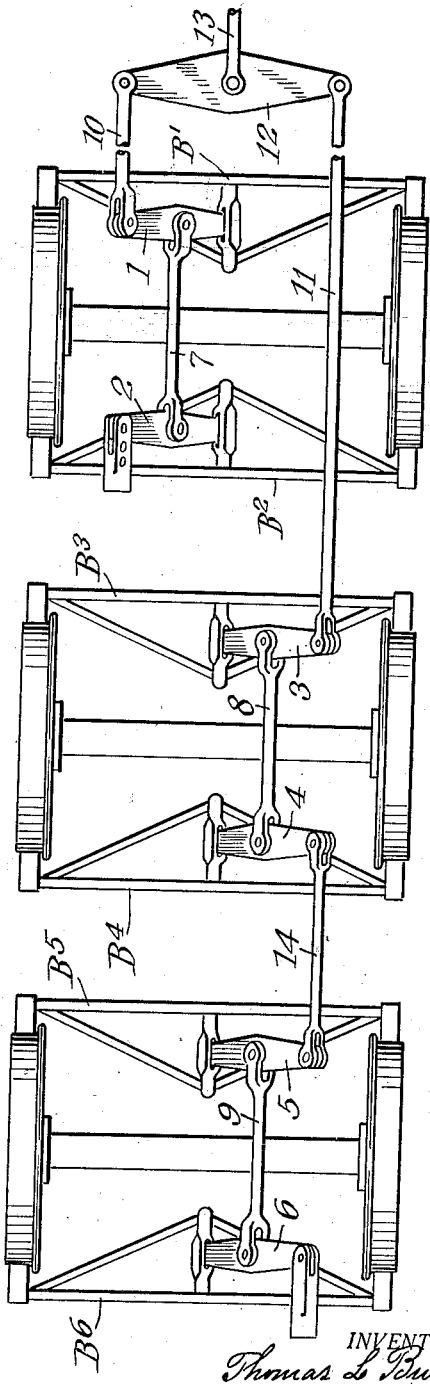
INVENTOR.
Thomas L. Burton
BY Edward H. Wright.
ATTORNEY

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

CLASP-BRAKE DESIGN FOR SIX-WHEELED TRUCKS.

1,274,676.   Specification of Letters Patent.   Patented Aug. 6, 1918.

Application filed September 14, 1916. Serial No. 120,054.

*To all whom it may concern:*

Be it known that I, THOMAS L. BURTON, a citizen of the United States, residing at St. Louis, in the State of Missouri, have invented a certain new and useful Improvement in Clasp-Brake Designs for Six-Wheeled Trucks, of which improvement the following is a specification.

This invention relates to brake rigging for six-wheeled trucks where brake beams are applied to both sides of each pair of wheels, and it has for its object to provide a simple construction of this type wherein a single truck lever is attached to the middle of each brake beam and so inclined that the pull rod connections at the upper ends may clear the members of the truck frame.

In the accompanying drawing: Figure 1 is a longitudinal section of a six-wheeled truck showing the brake rigging partly in side elevation; and Fig. 2, a plan view of the same.

According to the construction shown, the brake beams, $B^1$, $B^2$, $B^3$, $B^4$, $B^5$, $B^6$, are applied to both sides of each pair of wheels, and the truck levers, 1, 2, 3, 4, 5, 6, are pivotally connected at their lower ends at the middle points of the respective brake beams. The truck levers of each pair for the respective wheels are coupled at their intermediate points by the rods, 7, 8 and 9.

The pair of truck levers for one pair of wheels is inclined laterally in one direction from a vertical plane, while the other truck levers are inclined in the opposite direction, thus providing clearance for the pull rods, 10 and 11, one being connected to the upper end of the live truck lever, 1, of the first pair, and the other being connected to the live truck lever, 3, of the middle pair of wheels.

The rods, 10 and 11, are joined at the inner end of the truck by the cross equalizer, 12, to center of which is attached the pull rod, 13, actuated from the brake cylinder levers in the usual way. The truck lever, 2, of the first pair is a dead lever having a fulcrum at its upper end attached to the truck frame. The truck lever, 6, is also a dead lever having a fixed fulcrum at its upper end while the others are live levers. The live levers, 4 and 5, are connected at their upper ends by the rod, 14.

When power is applied to the pull rod, 13, it is transmitted by the equalizer, 12, to the rods, 10 and 11, in equal stresses, and from the rod, 10, through levers, 1 and 2, to the first pair of brake beams, and from rod, 11, through levers, 3, 4, 5 and 6, to the second and third pairs of brake beams, thus applying all the brake shoes with equal pressure.

By means of the inclination of the truck levers for the different pairs of wheels in opposite directions, the pull rods, 10 and 11, have sufficient clearance, and may be readily inserted without interfering with the members of the truck frame.

Having now described my invention, what I claim as new and desire to secure by Letters Patent is:

1. In a brake rigging for six-wheeled trucks, the combination with brake beams applied to both sides of each pair of wheels, of truck levers, one being pivotally connected to each brake beam, the truck levers for one pair of wheels being laterally inclined in the opposite direction from the other truck levers, a pull rod connected to the live truck lever of one pair, another pull rod connected to a truck lever of another pair, a cross equalizer connecting said pull rods at one end of the truck, and rods connecting the levers of each pair.

2. In a brake rigging for sixwheeled trucks, the combination with brake beams applied to both sides of each pair of wheels, of truck levers, one being pivotally connected to each brake beam, the truck levers for one pair of wheels being laterally inclined in the opposite direction from the other truck levers, a pull rod connected to the upper end of the live truck lever of the first pair, another pull rod connected to the upper end of a truck lever of the middle pair, said pull rods extending in the same direction toward one end of the truck, and rods connecting the levers of each pair.

3. In a brake rigging for six-wheeled trucks, the combination with brake beams applied to both sides of each pair of wheels, of truck levers, one being pivotally attached at its lower end to each brake beam, the pair of truck levers for the first pair being inclined laterally toward one side and the levers of the other pairs being inclined toward the other side, rods connecting the levers of each pair, a rod connecting the upper ends of one lever of the middle pair and one lever of the end pair, a pull rod connected to the upper end of the live lever of the first pair, and another pull rod connected to the upper end of a lever of the middle pair, said pull rods extending in the same direction toward one end of the truck.

In testimony whereof I have hereunto set my hand.

THOMAS L. BURTON.